Oct. 12, 1971 J. V. WILTSE 3,611,589
STEERING SIMULATION DEVICE FOR DRIVER TRAINING APPARATUS
Filed Jan. 30, 1970 2 Sheets-Sheet 1

INVENTOR
JAMES V. WILTSE

BY Craig, Antonelli, Stewart & Hill
ATTORNEYS

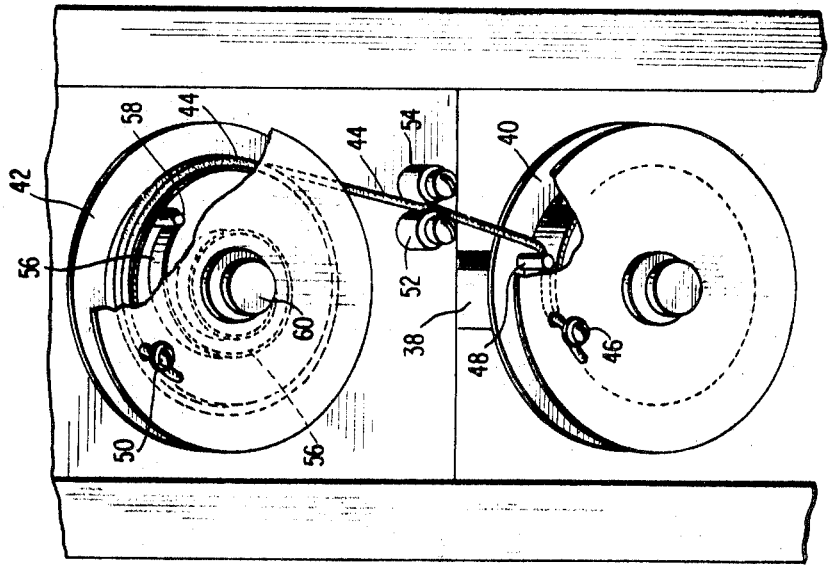
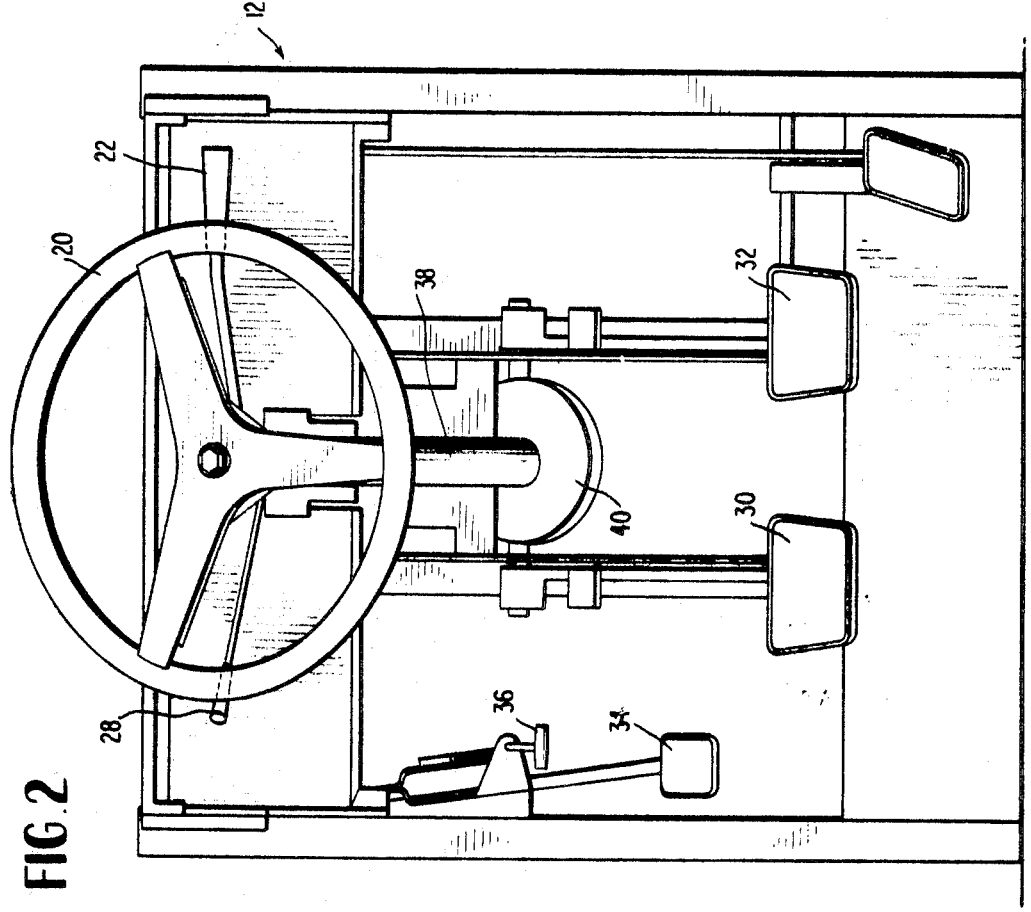

United States Patent Office 3,611,589
Patented Oct. 12, 1971

3,611,589
STEERING SIMULATION DEVICE FOR DRIVER
TRAINING APPARATUS
James V. Wiltse, Michigan City, Ind., assignor to
Visual Electronics Corporation, New York, N.Y.
Filed Jan. 30, 1970, Ser. No. 7,003
Int. Cl. G09b 9/04
U.S. Cl. 35—11
9 Claims

ABSTRACT OF THE DISCLOSURE

A steering simulation device for a driver-training apparatus, which includes steering assembly means, means connected thereto to provide a desired resistance to rotation of said steering assembly and to effect the return thereof to a fiducial position, and means to regulate such return.

Figure 1:
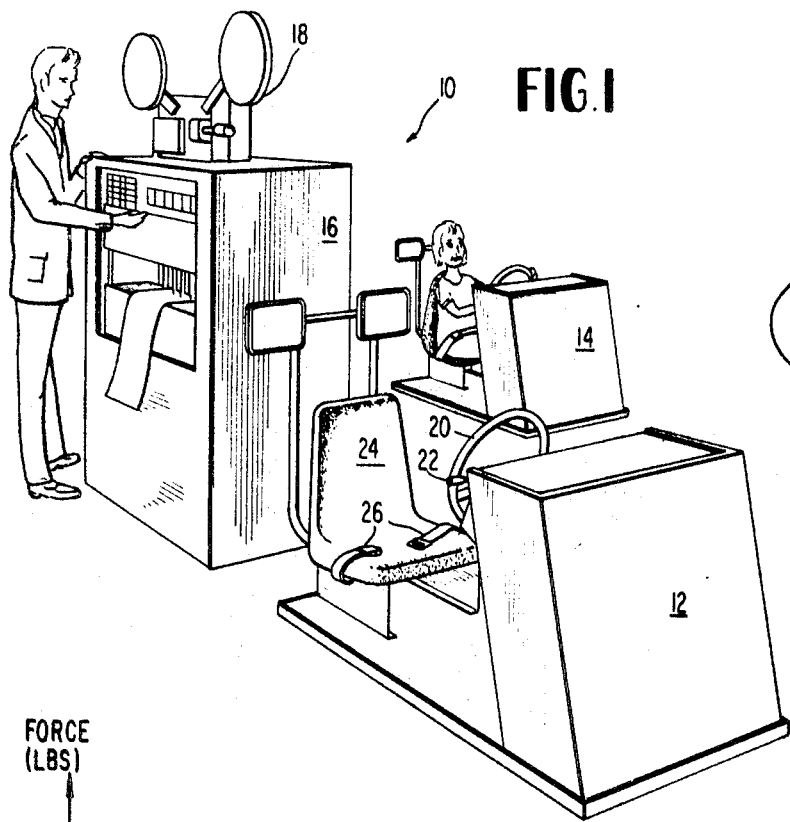

This invention pertains generally to driver training apparatus, and more particularly to an improved steering simulation device therefor.

The need for training persons in the art of vehicle operation has increased with the increase in the number of automobiles on the road. Years ago, when relatively few automobiles were in existence, adequate training of persons learning to operate automobiles was achieved by rather informal instruction of a student driver behind the wheel of an actual automobile on the road, with a relatively experienced driver sitting in the adjacent seat to provide instructions. At the beginning of the century, when only some eight thousand automobiles were on the road in the United States, this method of individual driver instruction in an ordinary passenger car proved quite satisfactory, except for the occasional accidents which occurred while the student was developing the proper mental attitudes and learning the required manual operations. However, today, with some one hundred million vehicles on the road in the United States alone, the need for more sophisticated driver training has become increasingly apparent.

As a first improvement over the foregoing informal approach to driver training, specially-equipped dual-control cars were introduced, whereby the student and an instructor each had access to a set of vehicle controls, providing improved instruction and a means for reducing the occurrence of accidents in driver training.

A further significant step forward later took place in the form of simulation equipments, wherein a student operates a simulated vehicle in response to his observation of a specially-prepared motion picture of a traffic scene which places the student and his simulated car "in the scene" by virtue of the fact that the camera employed in producing the motion picture is so positioned in the camera car as to view the scene from the driver's standpoint, whether it be the scene viewed through the windshield or that available through the rear window. Means are generally provided in such prior art simulators for observing and recording the student's manipulation of the simulator controls in response to the scene viewed, and an instructor is thus able to inform the student of his errors and the proper action that should have been taken.

The simulator system affords several obvious advantages, including the increased safety factor resulting from the fact that the instruction (or at least the initial, and more dangerous, stages thereof) takes place in a classroom or the like, rather than in a vehicle on the road. Further, the simulator system of driving instruction provides a means for increasing the student-teacher ratio, since a number of simulators can be positioned in a given classroom for simultaneous use by a plurality of students in observing a single motion picture depicting a given traffic scene, all under the guidance of a single instructor.

Many improvements have been made in the simulator equipments of the prior art, both as to creating an increasingly realistic "feel" in the simulator car and as to providing improved means for observing improper student responses. However, and with particular reference to the simulation of the operation of the steering wheel and the related assembly operated thereby, the devices of the prior art have generally failed to provide either a realistic "feel" to the student operator or an accurate return of the steering wheel assembly, once the student operator has simulated a turn in either direction, to the fiducial center or "straight ahead" position of the steering wheel. In short, the devices of the prior art have failed to provide a realistic and accurate return mechanism for the simulator steering wheel.

Accordingly, it is a primary object of the present invention to provide a steering simulation device for a driver training apparatus wherein the return of the simulator steering wheel to "top dead center" or the "straight ahead" position is accurate, reliable and realistic.

It is a further object of the present invention to provide a steering simulation device for a driver training apparatus wherein the "feel" of the steering simulation closely approximates that produced by an actual vehicle steering assembly.

In accordance with the present invention, these and other objects are achieved by means of a steering simulation device which includes a flexible elongate line the thickness of which is inversely proportional to the lengthwise tension applied thereto, means forming an aperture or restricted opening through which such elongate line extends, the aperture or restricted opening being smaller than the maximum thickness of such line when the latter is not under lengthwise tension but substantially as large as the minimum thickness of such line when the latter is subjected to lengthwise tension, a steering assembly connected to the line and adapted to exert a lengthwise tensile force in one direction in the line upon rotation of the steering assembly, and return means connected to the elongate line at a point thereon remote from the steering assembly relative to the aperture means and adapted to rsiliently exert a lengthwise tensile force in the opposite direction in the line. Upon rotation of the steering assembly, the elongate line is in a condition of minimum thickness as a result of being subjected to two opposing tensile forces, thus being free to pass easily through the aperture, while the return of such line in the opposite direction through the aperture under the influence of the single tensile force of the return means results in a condition of increased thickness of the line, with attendant frictional drag at the aperture.

Figure 4:
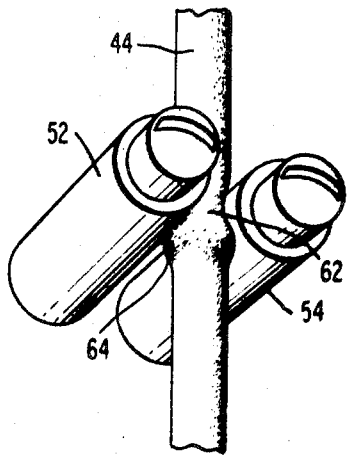
Figure 6:
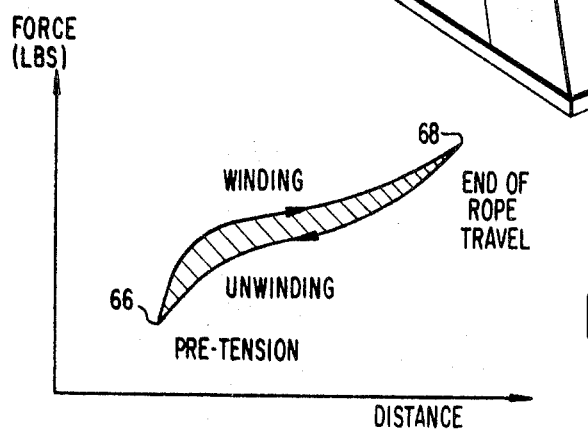
Figure 5:
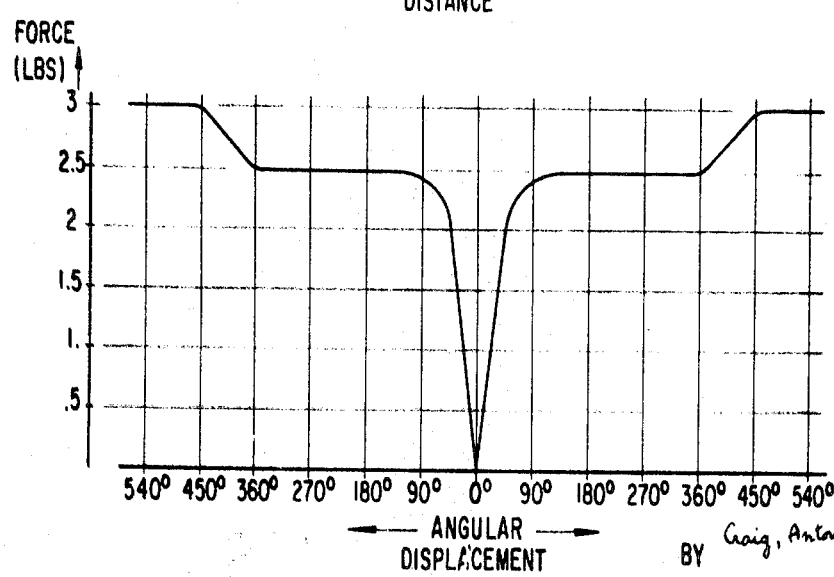

With the above considerations and objects in mind, the invention itself will now be described in connection with a preferred embodiment thereof, given by way of example and not of limitation, and with reference to the accompanying drawings, in which:

FIG. 1 is a perspective view of a typical driver training apparatus installation, FIG. 2 is a vertical elevation view of the rear face of the front section of a simulator car of the type shown in FIG. 1, with portions having been removed for the sake of clarity, FIG. 3 is a vertical elevation view of the front face of the front section of the simulator car of FIG. 2, with portions having been removed for the sake of clarity, FIG. 4 is a perspective view in an enlarged scale of a portion of the apparatus shown in FIG. 3, FIG. 5 is a graph illustrating the relationship between applied force and angular displacement representative of steering assemblies in actual motor vehicles, and FIG. 6 is a graph illustrating the force-vs.-displacement relationship existent in a portion of the device of the present invention during the operation thereof.

Referring now more particularly to FIG. 1, a typical driver training apparatus installation is shown therein, indicated generally at 10, and including simulator cars 12 and 14 and an instructor's console 16, including a movie projector 18 for projecting upon a screen (not shown) the traffic situation to be observed and reacted to by the students in the several simulator cars. As is understood by those skilled in this art, the student's reactions to the various incidents observed in the training film cause the student to take certain corrective actions by way of manipulations of the simulator car controls. Such manipulations of the individual simulator car control mechanisms are recorded in the instructor's console 16 and compared therein to the correct manipulations that are called for by the training film. By means of this comparison, the student's responses may be graded or scored, with the student preferably being advised instantaneously of incorrect actions taken, and, in some instances, the proper action that should have been taken.

The equipment in each simulator car closely approximates the essential equipment found in the ordinary automotive vehicle, including a steering wheel 20, a gearshift or transmission lever 22, a seat 24 and a seat belt 26, all shown in FIG. 1.

FIG. 2 shows in somewhat greater detail the controls available to the student driver in the simulator car 12, including the steering wheel 20, the transmission control 22, turn indicator lever 28, clutch pedal 30, brake pedal 32, parking brake pedal 34 and parking brake release handle 36. Other controls are generally provided, though not shown in FIG. 2, as well as the typical indicator array found in the ordinary automotive vehicle dash.

Steering wheel 20 is attached to one end of a rotatable steering column (not shown) which is mounted for rotation within the relatively stationary outer column 38, the latter being suitably mounted in the framework of the simulator car 12. The remote end of the steering column is connected to a pulley 40, whereby the steering wheel 20 and the pulley 40 move in unison about their common axis of rotation.

Portions of the simulator car 12 (primarily the floorboard thereof) as shown in FIGS. 2 and 3 have been removed for the sake of clarity, thus permitting the showing of steering wheel 20 and pulley 40 connected thereto in a single view (as in FIG. 2); it will be understood that with the floorboard in place in FIG. 2, the pulley 40 would be hidden from view.

As may be seen in FIG. 3, a second pulley or reel 42 is mounted for rotation in the plane of rotation of pulley 40. That is to say, the two pulleys or reels 40 and 42 are substantially coplanar, being mounted on parallel axes for rotation in their common plane. Since pulley 40 is mounted for rotation in a plane substantially perpendicular to the axis of the steering column, with the latter being at a usual angle with respect to the vertical and horizontal directions, it will be understood that the common plane of rotation for reels 40 and 42 is likewise canted with respect to the vertical and horizontal directions.

Extending between reels 40 and 42, and lying substantially in their common plane of rotation, is an elongate flexible line 44, one end of which is fixedly secured to the pulley 40 at a point near the rim thereof, by way of a suitable clamping means 46, which may comprise a screw or the like which serves to clamp the end of the flexible line 44 to the rim of the pulley 40. The flexible line 44 may pass under a strut 48 positioned substantially at the rim of the reel 40 with the strut 48 thus serving, at least partially, as a strain-relief member for the clamping means 46.

The remote or upper end of flexible line 44 is connected to the reel 42 at a point spaced away from the center of rotation thereof, and the means for securing the line 44 to the reel 42 may comprise a clamping means in the form of a threaded connector 50. Positioned on opposite sides of the line 44 are a pair of roller members 52 and 54 which define a gap or aperture therebetween through which the elongate flexible line 44 extends. The two rollers 52 and 54 are mounted for rotation about parallel spaced-apart axes, the distance between the adjacent roller surfaces defining the gap through which the line 44 extends, whereby, as will be further explained, a desired frictional drag or braking force may be selectively applied to the line 44 in the operation of the device.

As is further shown in FIG. 3, the upper reel 42 has associated therewith a spiral spring 56 which is fixed to the reel 42 at 58 by any suitable means. The remote or inner end of spring 56 is secured to a fixed arbor 60 which forms a relatively stationary hub for the reel 42. Thus, relative rotary movement between the reel 42 and the stationary hub 60 results in a winding or unwinding of the spring 56.

The flexible elongate line 44 is of a material or structure such that the thickness of the line is inversely proportional to the lengthwise tension applied thereto. That is to say, the thickness or diameter of the line 44 is greatest when the line is not taut, while the thickness is progressively reduced with increasing lengthwise tension in the line. One example of a suitable line for this purpose in accordance with a preferred embodiment of the invention is a braided nylon rope, the diameter of which is easily observable as being inversely proportional to the tension along the length of the rope. However, lines of other materials or structures having the desired characteristic may equally as well be employed. The aperture or gap formed by the paired rollers 52 and 54 is of such dimension as to be somewhat smaller than the maximum thickness or diameter of the line 44 when the latter is not under lengthwise tension, but substantially as large as the minimum thickness or diameter of the line 44 when the latter is subjected to lengthwise tension. Thus, when line 44 is subjected to maximum tension, its diameter is at a minimum, and the line 44 may thus pass freely between the rollers 52 and 54 in response to the tensile forces applied. However, when the tension on the line 44 is relatively low, the diameter of the line is correspondingly increased, and the rollers 52 and 54 are in frictional engagement with the adjacent surfaces of the line 44 extending between the rollers. Accordingly, it will be appreciated that this engagement of the line 44 by the rollers 52 and 54 produces a dragging or braking effect on the movement of the line 44 therebetween under low tension.

The relationship between the rollers 52 and 54 and the line 44 when the latter is under little or no tension is shown in FIG. 4 to constitute a "necking" and "bunching" of the line 44 between and adjacent the rollers, respectively. That is to say, under the condition of low tension, the line 44 is necessarily "necked down" at a point immediately adjacent the rollers 52 and 54, since the diameter of the line 44 under such low tension is, as stated above, greater than the gap established or defined by the rollers 52 and 54. As a result of the "necking" at 62 in FIG. 4, a "bunching" 64 of the external surface of the line 44 takes place at a point immediately adjacent the contact between the rollers 52 and 54 and the line 44 on the upstream side of the latter as it passes between the two rollers. In this connection, the direction of movement of line 44 in FIG. 4 is from the bottom toward the top of the page. As a result of this "necking" and "bunching," the desired variable drag or braking effect is applied to the line 44 in the operation of the steering simulation device of the present invention.

In assembling the apparatus of the present invention, the reel 42 is turned relative to its stationary hub 60 a desired amount prior to the attachment of the line 44 to the reel 42, in order to apply a desired minimum tension to the line 44 even in the absence of rotation of the steering wheel pulley 40 from a position corresponding to "top dead center." Thus, the line 44 is constantly subjected to at least this minimum tensile force, with a much greater tension being applied to the line 44 upon rotation of the steering wheel pulley 40 in either direction, with the attendant and greater tensile force applied to the line 44 thereby. Obviously, rotation of the pulley 40 in either direction, corresponding to a right or left turn in the simulator car, results in a downward pull on the line 44, in opposition to the pre-tension or minimum tension applied to the line 44 by means of the spring 56.

The operation of the steering simulation device of the present invention is apparent from the foregoing description of the structure thereof. When a student in simulator car 12 responds to a given traffic situation viewed by the student on the projection screen, such as a need to execute a left turn, the student turns the steering wheel 20 in a counterclockwise direction (as viewed by the student), resulting in an identical movement of the steering wheel pulley 40. This movement of the pulley 40 as viewed in FIG. 3 is a clockwise movement, resulting in a downward pull on the line 44. Just prior to the application of this downward pull, the line 44 was under a relatively low tension as a result of the upward pull effected by the spring 56, which constantly urges the reel 42 in a counterclockwise direction (as seen in FIG. 3). Under this previously existing condition of low tension, the line 44 was gripped by the rollers 52 and 54. However, upon the application of the downward pull on line 44 as a result of the rotation of steering wheel pulley 40, the line 44 is immediately subjected to a much greater tension (the two applied forces being in opposition), and the diameter of the line 44 correspondingly decreases, permitting the line to freely pass between the rollers 52 and 54 so long as the steering wheel 20 is held in a position other than that of "top dead center."

Upon completion of the simulated left turn, the student driver in the simulator car 12 returns the steering wheel 20 in a clockwise direction to the "straight ahead" or "top dead center" position. In so doing, the downward pull just previously exerted by the steering wheel pulley 40 on line 44 is removed, and the line 44 thus begins to pass upwardly between the rollers 52 and 54 under the influence of the spring 56. In the resultant condition of low tension in line 44, the diameter of the line is significantly greater, resulting in the aforementioned "necking" and "bunching" of the line 44 as it passes upwardly between the rollers 52 and 54, and a desired drag or damping effect is thus achieved, not only closely approximating the feel of an actual steering assembly, but also preventing a significant overshoot of the simulator steering assembly as it returns to "top dead center." In this manner, the steering simulation device of the present invention permits more natural return to the "straight ahead" position of the steering assembly, without significant overshoot and with reliable return to the "straight ahead" position.

FIG. 5 shows in rectangular coordinate form the relationship between angular displacement of actual road vehicle steering assemblies and the force required to produce such displacement. The curve of FIG. 5 is a composite of a plurality of automobiles tested in order to learn the nature of the force-turn curve in a desire to more closely approximate the actual conditions encountered by the student driver when he first takes the wheel of a road vehicle, as opposed to his training in the stationary simulator car.

FIG. 6 illustrates schematically the relationship between the force applied to, for example, the line 44 of the apparatus of this invention and the travel thereof, corresponding to the turning of the simulator steering wheel 20. In FIG. 6, point 66 represents the pre-tension or minimum tensile force applied to the line, whereas point 68 is representative of conditions at the simulated turn limit, in either direction. As an increasing force is applied, by way of turning the simulator steering wheel 20 in either direction to effect a turn, the upper or "winding" curve is followed from point 66 to point 68; obviously, the expression "winding" refers to the action occurring in spring 56 in reel 42. Upon the completion of a simulated turn, the path of return from point 68 in FIG. 6 to point 66 therein is the lower or "unwinding" curve, as shown. As will be appreciated, the difference between these two curves is a result of, at least in part, the hysteresis of the material of spring 56, along with the fact that the force applied to line 44 in the return motion is significantly less than that applied in the initial turn condition, resulting in a greater damping by means of the aperture-defining rollers 52 and 54.

The invention has been described above in some detail, and particularly with reference to its application to an apparatus employed in the training of students for operating motor vehicles. However, it will be apparent to those skilled in the art that the apparatus of the present invention may equally well be employed for training students in the operation of vehicles other than land vehicles. Further, the vehicle simulator may well include an additional or other rotary control member characterized by a "top dead center" position and to which the teachings of the present invention may be applied. Additionally, it will be understood that the present invention is not limited to the choice of a particular material or structure for use as line 44, as long as the characteristic of the material or structure used is such that the diameter or thickness thereof is inversely proportional to the elongate tension applied thereto. Hence, the invention is not to be considered as limited to the particular details given, nor to the specific application to which reference has been made during the description of the apparatus, except insofar as may be required by the scope of the appended claims.

What is claimed is:

1. In a driver-training apparatus, a steering simulation device, comprising:
    flexible elongate line means the thickness of which is inversely proportional to the lengthwise tension applied thereto,
    means forming an aperture through which said elongate line means extends, said aperture being smaller than the maximum thickness of said elongate line means when the latter is not under lengthwise tension, but substantially as large as the minimum thickness of said elongate line means when the latter is subjected to lengthwise tension,
    steering assembly means connected to said elongate line means and adapted to exert lengthwise tension in one direction in said line means upon rotation of said steering assembly means, and
    means connected to said elongate line means at a point thereon remote from said steering means relative to said aperture means and adapted to resiliently exert lengthwise tension in the opposite direction in said line means,
    whereby upon such rotation of said steering assembly means said elongate line means is in a condition of minimum thickness as a result of being subjected to two opposing tensile forces, thus being free to pass easily through said aperture, while the return of said line means in the opposite direction through said aperture under the influence of a single tensile force results in a condition of increased thickness of said line means with attendant frictional drag at said aperture means.

2. In a driver-training apparatus, a steering simulation device in accordance with claim 1, wherein said flexible elongate line means comprises a nylon rope.

3. In a driver-training apparatus, a steering simulation device in accordance with claim 1, wherein said flexible elongate line means comprises a braided nylon rope.

4. In a driver-training apparatus, a steering simulation device in accordance with claim 1, wherein said aperture-forming means comprises a pair of parallel spaced-apart roller members.

5. In a driver-training apparatus, a steering simulation device in accordance with claim 1, wherein said steering assembly means includes a rotatably mounted pulley to which said elongate line means is attached.

6. In a driver-training apparatus, a steering simulation device in accordance with claim 1, wherein said steering assembly means includes a steering wheel, a rotatable shaft on which such steering wheel is mounted and a pulley on said rotatable shaft to which said elongate line means is attached.

7. In a driver-training apparatus, a steering simulation device in accordance with claim 1, wherein said means for resiliently exerting tension on said elongate line means includes a spring connected between said line means and a relatively fixed point.

8. In a driver-training apparatus, a steering simulation device in accordance with claim 1, wherein said means for resiliently exerting tension on said elongate line means includes a reel to which said elongate line means is attached, and a spiral spring attached at respective ends thereof to said reel and a relatively fixed point.

9. In driver-training apparatus, a steering simulation device in accordance with claim 8, wherein said spiral spring is under tension irrespective of the position of said steering assembly means.

References Cited

UNITED STATES PATENTS 2,700,227   1/1955   Arkell et al. _____ 35—11

WILLIAM H. GRIEB, Primary Examiner

U.S. Cl. X.R.

74—501.5